United States Patent
Gaskins et al.

(10) Patent No.: US 6,549,985 B1
(45) Date of Patent: Apr. 15, 2003

(54) METHOD AND APPARATUS FOR RESOLVING ADDITIONAL LOAD MISSES AND PAGE TABLE WALKS UNDER ORTHOGONAL STALLS IN A SINGLE PIPELINE PROCESSOR

(75) Inventors: Darius D. Gaskins, Austin, TX (US); G. Glenn Henry, Austin, TX (US); Rodney E. Hooker, Austin, TX (US)

(73) Assignee: I P - First, LLC, Fremont, CA (US)

( * ) Notice: Subject to any disclaimer, the term of this patent is extended or adjusted under 35 U.S.C. 154(b) by 0 days.

(21) Appl. No.: 09/538,304

(22) Filed: Mar. 30, 2000

(51) Int. Cl.$^7$ ................................................ G06F 12/00
(52) U.S. Cl. ...................... 711/123; 711/125; 711/126; 711/140; 711/169
(58) Field of Search .................... 711/123, 119, 711/125, 126, 140, 169

(56) References Cited

U.S. PATENT DOCUMENTS

| | | | |
|---|---|---|---|
| 5,404,486 A | * 4/1995 | Frank et al. | 711/128 |
| 5,845,101 A | * 12/1998 | Johnson et al. | 711/125 |
| 6,085,292 A | * 7/2000 | McCormack et al. | 711/118 |
| 6,088,788 A | * 7/2000 | Borkenhagen et al. | 711/140 |
| 6,145,054 A | * 11/2000 | Mehrotra et al. | 711/119 |
| 6,154,815 A | * 11/2000 | Hetherington et al. | 711/140 |
| 6,237,073 B1 | * 5/2001 | Dean et al. | 711/118 |

OTHER PUBLICATIONS

Intel Pentium Processor Family Developer's Manual vol. 3: Architecture and Programming Manual, 1995, section 11.3.

\* cited by examiner

Primary Examiner—Do Hyun Yoo
Assistant Examiner—Brian R. Peugh
(74) Attorney, Agent, or Firm—E. Alan Davis; James W. Huffman (57) ABSTRACT

A data cache in an in-order single-issue microprocessor that detects cache misses generated by instructions behind a stalled instruction in the microprocessor pipeline and issues memory requests on the processor bus for the missing data so as to overlap with resolution of the stalled instruction, which may also be a cache miss, is provided. The data cache has pipeline stages that parallel portions of the main pipeline in the microprocessor. The data cache employs replay buffers to save the state, i.e., instructions and associated data addresses, of the parallel data cache stages so that instructions above the stalled instruction can continue to proceed down through the data cache and access the cache memory to generate cache misses. The data cache restores the data cache pipeline stages upon detection that stall will terminate. The data cache also detects TLB misses generated by instructions subsequent to the stalled instruction and overlaps page table walks with the stall resolution.

20 Claims, 4 Drawing Sheets

| address | valid instr | instr type | mem I/O | exec unit | data size | cache data |
|---|---|---|---|---|---|---|
| 402 | 404 | 406 | 408 | 412 | 414 | 416 |

FIG. 5

| clock → <br> stage ↓ | 1 | 2 | 3 | 4 | many clocks | n-2 | n-1 | n |
|---|---|---|---|---|---|---|---|---|
| STALL asserted? | N | Y | Y | Y | Y | Y | Y | N |
| R | C | D | D | D | D | D | D | D |
| A/X | B/B | C/C | C/C | C/C | C/C | C/A | C/B | C/C |
| D/Y | A/A | B/B | B/C | B/C | B/C | B/C | B/A | B/B |
| G/Z[1] | S/S | A/A | A/B | A/C | A/C | A/C | A/C | A/A |
| E | ---- | S | S | S | S | S | S | S |

Note 1: Cache and TLB misses are detected in the Z-stage.

METHOD AND APPARATUS FOR RESOLVING ADDITIONAL LOAD MISSES AND PAGE TABLE WALKS UNDER ORTHOGONAL STALLS IN A SINGLE PIPELINE PROCESSOR

BACKGROUND OF THE INVENTION

1. Field of the Invention

This invention relates in general to the field of pipelined microprocessors, and more particularly to microprocessor data cache operations.

2. Description of the Related Art

Modern microprocessors operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach*, $2^{nd}$ edition, by John L. Hennessy and David A. Patterson, Morgan Kaufmann Publishers, San Francisco, Calif., 1996. The authors go on to provide the following excellent illustration of pipelining:

> A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line.

An example of a pipeline stage, typically at the top of the pipeline, is one that fetches instructions from memory for the pipeline to execute. Another example is a stage that calculates addresses of data operands to be loaded from or stored to memory as specified by the instruction in the stage. Another example is a stage that performs arithmetic operations, such as adds or multiplies, on data operands associated with the instruction in the stage. Each of the stages is separated by a pipeline register that saves the output of the pipeline stage above the register at the end of a clock cycle and provides that output to the pipeline stage below the register at the beginning of the next clock cycle.

Typically, each stage performs its function during one processor clock cycle. Thus, every clock cycle each instruction in the pipeline progresses downward one stage along the pipeline. However, certain events or conditions prevent an instruction from executing in a given stage and prevent the instruction from progressing to the next stage in the pipeline on the next clock cycle. These conditions are referred to as "stall conditions" because the pipeline must be "stalled" until the condition is resolved. That is, all instructions above the stalled instruction in the pipeline are held in their current stage by the pipeline registers rather than being allowed to progress to the next stage. Instructions below the stalled instruction stage may continue down the pipeline. There are three main causes of stalls: resource conflicts, data hazards and cache misses.

Resource conflicts occur when the hardware components in the microprocessor cannot service a given combination of instructions in simultaneous overlapped execution within the pipeline. For example, a processor may support an arithmetic instruction, such as a floating point or MMX multiply instruction. The hardware may include a multiplier circuit that requires multiple processor clock cycles to perform the multiply and the multiplier is not itself pipelined, i.e., it cannot receive a second multiply instruction until it has completed the current multiply instruction. In this case, the processor must stall the pipeline at the multiplier stage.

Data hazards, or data dependencies, are another main cause of pipeline stalls. Data hazards occur when an instruction depends on the results of an instruction ahead of it in the pipeline, and therefore cannot be executed until the first instruction executes. One class of data hazards occurs when instructions access input/output (I/O) devices.

I/O devices typically include status and control registers that are read and written by the microprocessor. Some microprocessors, such as x86 processors, have dedicated instructions for accessing the registers of I/O devices, such as the x86 "in" and "out" instructions. These instructions address a separate address space of the processor bus, namely the I/O space. The other way I/O devices are accessed is by mapping them into the memory address space of the processor. Such an I/O device is referred to as a memory-mapped I/O device and the region in which the I/O device is mapped is referred to as a memory-mapped I/O region. Typically, memory mapped I/O regions are specified via registers within the microprocessor.

An example of an I/O related data hazard occurs when a first instruction writes a value to an I/O register and the next instruction reads from an I/O register on the same device, such as a store to a memory-mapped I/O region followed by a load from the same memory-mapped I/O region. Due to the nature of I/O devices, in order to insure proper operation of the I/O device, the two instructions must be guaranteed to execute in order. That is, the read cannot be executed until the write has completed.

Cache misses are a third common cause of pipeline stalls. Program execution speed often is affected as much by memory access time as by instruction execution time. This is readily observable from the fact that a typical system memory access might take 40 processor clock cycles, whereas a typical average execution time per instruction in a well-designed pipelined processor is between 1 and 2 processor clock cycles.

Load and store instructions are used to access memory. Load instructions read data from system memory and store instructions write data to system memory. When a memory access instruction reaches a stage in a processor pipeline where the memory access is performed, the pipeline must stall waiting for the memory access to complete. That is, during the typical 40 clock cycles of the memory access, the memory access instruction remains in its current stage until the specified data is written or read. When a stall occurs, all of the other instructions in the pipeline behind the stalled instruction also wait for the stalled memory access instruction to resolve and move on down the pipeline.

Processor designers attempt to alleviate the memory access time problem by employing cache memories within the processor. Data caches, which commonly require only one or two clock cycles per memory access, significantly reduce the negative effects of stalls caused by load and store instructions introduced by the large system memory access times. However, when a cache miss occurs, a pipeline stall must ensue.

Some microprocessor designers have attempted to improve on the pipelined approach by "widening" the processor, i.e., by adding more pipelines within the processor in order to execute multiple instructions in parallel and to execute those instructions out of program order where advantageous and possible. These processors are commonly referred to as "superscalar" or "multiple-issue" processors since they issue multiple instructions at a time into multiple pipelines for parallel execution. Another term associated with the techniques employed by multiple-pipeline processors is instruction level parallelism (ILP).

Typically, processor architectures require the processor to retire instructions in-order. That is, any program-visible processor state changes must be made in the order of the program instruction sequence. However, multiple-issue processors commonly execute instructions out of order by employing reorder buffers. The processor fetches a stream of instructions of a program from memory and places the instructions into the top of the reorder buffer. The processor searches the reorder buffer looking for dependencies between the various instructions, such as data hazards or resource conflicts discussed above.

Instructions that do not have dependencies may be reordered within the reorder buffer for out of order execution. The instructions are then removed from the bottom of the reorder buffer and distributed to different pipelines within the superscalar processor for potential out of order execution.

To illustrate, a superscalar processor might receive a load instruction requiring a memory access followed by an add instruction not requiring a memory access. If the two instructions are independent, the superscalar processor will issue the load instruction to one pipeline and the add instruction to another. Since the add instruction does not require a memory access, it will likely complete before the load instruction, even though the load instruction precedes the add instruction in the program sequence.

Out of order execution is a common characteristic of multiple-issue processors facilitated by their reorder buffers. Stated alternatively, out of order processors have the capability to reorder instructions soon after they are fetched into the processor so that the reordered instructions are sent down the pipelines of the processor for execution in different order than specified by the program that they constitute, as illustrated in the previous example. In contrast, an in-order single-pipeline processor sends instructions down its pipeline in program order.

However, superscalar processors have their disadvantages. First, multiple instruction issue and out of order execution add complexity to the processor design that typically results in greater cost in terms of reduced clock speeds, larger die sizes and longer development periods. Furthermore, it has been observed that in practice processor throughput does not scale with the number of pipelines added. For example, a typical dual-pipeline processor may provide on the order of 1.3 times the instruction throughput of a comparable single-pipeline processor in executing typical programs.

Finally, it has been observed that the throughput improvement enjoyed by superscalar processors is largely a function of the degree of parallelism exhibited by the particular software program being executed. Computationally intensive programs, such as CAD programs or graphic-intensive games, exhibit high degrees of parallelism, superscalar processors generally execute these programs much faster than comparable single-pipeline processors. In contrast, business oriented programs, such as word processors, exhibit low degrees of parallelism and show relatively slight improvement in execution times on superscalar processors over single-pipeline processors.

The most common explanation for these observations is that, as stated above, program execution speed often is dominated by memory access time rather than instruction execution time. That is, the detrimental impact on processor performance that large memory access latencies impose often dominates gains made by multiple instruction issue and out of order execution. Thus, memory access latency hampers both superscalar and single-issue in-order microprocessor performance.

Although data caches help alleviate the memory access latency problem, as described above, they do not address certain situations, such as when a new data set is brought into the cache. For example, a new data set must be brought in when a newly loaded program begins to access its data. Additionally, an already loaded program may begin to access new data, such as a new database or document file, or new records of an already accessed database. In these situations, a relatively long series of load instructions will be executed, often in a program loop, to load the data from memory to be operated upon by the processor. The load instructions generate a series of cache misses.

As mentioned above, the added complexity of superscalar processors has a negative impact on clock speed, die size and development periods. Therefore, single-pipeline in-order processors may be desirable in many contexts.

However, one problem that may be observed from the preceding discussion is that the serialization of memory accesses behind a series of memory access instructions in a single-pipeline in-order processor can have devastating effects on performance. In a common situation, a first cache miss is detected and the pipeline stalls while the missing data is loaded from system memory. The load of the missing data typically requires approximately processor 40 clock cycles. When the data is returned from system memory and placed into the cache, the pipeline stall ends. Then, the next instruction (or perhaps second or third instruction) generates a cache miss and the pipeline stalls while the missing data is loaded from system memory, which requires another 40 clock cycles. This continues until the new data set is loaded into the cache.

Therefore, what is needed is a single instruction issue in-order execution microprocessor that reduces memory access latency by detecting cache misses generated by instructions behind a stalled instruction and overlapping requests for the missing data with resolution of the stalled instruction.

In addition, most modern microprocessors support virtual memory systems. In a virtual memory system, programs specify data using virtual addresses corresponding to the address space of the processor. The virtual address space is larger than the amount of physical memory in the system. The physical memory is backed by a permanent disk storage system. The physical memory is managed by the operating system as fixed size blocks, typically 4 KB large, called pages. At a any given time, a page may reside in the physical system memory or on disk. As a page is needed and brought into physical memory from disk, another page presently in physical memory, typically the least recently used page, is swapped out to disk and the new page replaces the swapped-out page.

A by-product of the "paging" process and the fact that the physical and virtual memory sizes do not match is that the processor must translate the virtual addresses into physical addresses. This process is referred to as "page translation." To perform page translation, a processor searches or "walks" data structures in system memory referred to as page tables that provide the necessary address translation information.

Page table walks can be time consuming, because unless the page table data is in the data cache, page table walks involve memory accesses. For this reason, processors typically employ a small hardware cache referred to as a translation lookaside buffer (TLB) to cache already translated physical addresses. When a processor performs a page table walk and translates a virtual memory address into a physical memory address, the processor caches the physical address in the TLB. In single-issue in-order processors, TLB misses are serialized like cache misses and therefore also negatively impact processor performance.

Therefore, what is needed is a single-issue in-order microprocessor that reduces TLB miss latency by detecting TLB misses generated by instructions behind a stalled instruction and overlapping page table walks with resolution of the stalled instruction.

SUMMARY

To address the above-detailed deficiencies, it is an object of the present invention to provide a single instruction issue in-order execution microprocessor that reduces memory access latency by detecting cache misses generated by instructions behind a stalled instruction and overlapping requests for the missing data with resolution of the stalled instruction. Accordingly, in attainment of the aforementioned object, it is a feature of the present invention to provide a single-issue in-order pipelined microprocessor for accessing data stored in a memory coupled to the microprocessor by a bus. The microprocessor includes a plurality of buffers configured to receive data from the memory on the bus, and a data cache, coupled to the plurality of buffers. The data cache determines whether one or more instructions following a stalled instruction in the microprocessor pipeline specify data missing in the data cache. The data cache allocates one or more of the plurality of buffers to receive the missing data and issues one or more requests on the bus for the missing data during resolution of the stalled instruction.

An advantage of the present invention is that it significantly reduces the aggregate memory access time for two or more load instructions in close proximity that generate cache misses, which commonly occurs when a new data set is encountered.

In another aspect, it is a feature of the present invention to provide a data cache in an in-order single instruction issue microprocessor. The data cache includes a cache memory for storing data, at least one buffer for storing state information regarding a plurality of instructions in the data cache upon detection of a stall condition in the in-order single-issue microprocessor, and control logic, coupled to the buffer and the cache memory. The control logic detects the stall condition, saves in response to detection of the stall condition the state information in the buffer, and determines during the stall condition whether data specified by one or more of the plurality of instructions is missing in the cache memory.

In yet another aspect, it is a feature of the present invention to provide a method for resolving data cache misses in a single-issue in-order pipelined microprocessor during stalls of the microprocessor pipeline. The method includes detecting a stall condition in the pipeline generated by an instruction issued by the microprocessor, saving state information associated with a plurality of instructions issued subsequent to the instruction in response to detecting the stall condition, and determining whether one or more of the plurality of instructions specifies data missing in the data cache during the stall condition.

It is also an object of the present invention to provide a data cache in a single-issue in-order microprocessor that reduces TLB miss latency by detecting TLB misses generated by instructions behind a stalled instruction and overlapping page table walks with resolution of the stalled instruction. Accordingly, in attainment of the aforementioned object, it is a feature of the present invention to provide a data cache in an in-order single instruction issue microprocessor. The data cache includes a translation lookaside buffer (TLB) for storing physical memory addresses, at least one buffer for storing state information regarding a plurality of instructions in the data cache upon detection of a stall condition in the in-order single-issue microprocessor, and control logic, coupled to the buffer and the TLB. The control logic detects the stall condition, saves the state information in the buffer in response to detection of the stall condition, and determines during the stall condition whether a physical address associated with one or more of the plurality of instructions is missing in the TLB.

An advantage of the present invention is that it significantly reduces the aggregate page table walk time for a memory access that generates a TLB miss proximately following a stalled instruction.

BRIEF DESCRIPTION OF THE DRAWINGS

These and other objects, features, and advantages of the present invention will become better understood with regard to the following description, and accompanying drawings where.

DETAILED DESCRIPTION

Figure 1:
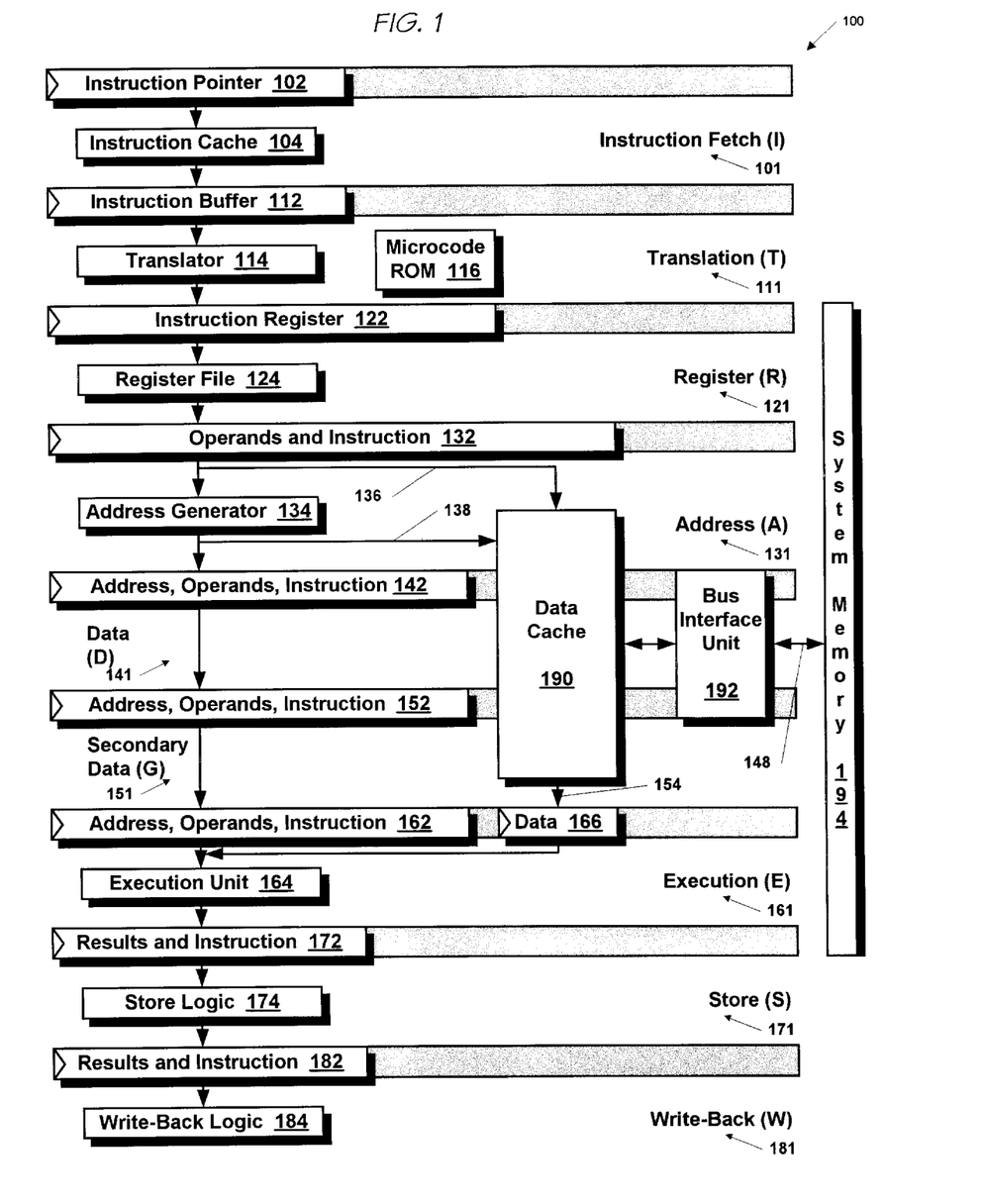
FIG. 1 is a block diagram of an in-order single-issue pipelined microprocessor according to the present invention.

Referring to FIG. 1, a block diagram of an in-order single-issue pipelined microprocessor 100 according to the present invention is shown. The microprocessor 100 comprises various pipeline stages including: Instruction Fetch (I) stage 101, Translation (T) stage 111, Register (R) stage 121, Address (A) stage 131, Data (D) stage 141, Secondary Data (G) stage 151, Execution (E) stage 161, Store (S) stage 171 and Write-Back (W) stage 181. Instructions enter at the top of the pipeline 100 in the I-stage 101 and exit, i.e., are retired, at the bottom of the pipeline in the W-stage 181 where the microprocessor 100 state is updated.

The I-stage 101 comprises an instruction pointer register 102 that stores a memory address of the next instruction, or cache line containing the next instruction, to be fetched from an instruction cache 104 coupled to the instruction pointer 102. The instruction cache 104 is a memory, such as an L1 cache, that caches previously fetched program instructions from a system memory 194 coupled to the microprocessor 100 by a processor bus 148. Preferably, the system memory 194 comprises a hierarchical memory system, such as a main dynamic random access memory (DRAM) and an L2 cache memory. Instructions fetched from the instruction cache 104 are placed into an instruction buffer 112 coupled to the instruction cache 104.

The T-stage 111 comprises a translator 114, coupled to the instruction buffer 112, which translates program macroinstructions into microinstructions, such as load and store instructions. A load instruction loads data from memory 194 into the microprocessor 100. A store instruction stores data from the microprocessor 100 into memory 194. Preferably, the macroinstructions are x86 instructions. The microinstructions are simpler instructions than the macroinstructions that may be quickly executed by the various stages of the microprocessor 100. A single macroinstruction may be translated by translator 114 into multiple microinstructions. However, the microinstructions are issued by the translator 114 one at a time to the lower stages of the pipeline 100. That is, microprocessor 100 is a single instruction issue, or single-issue, microprocessor. As may be seen, microprocessor 100 has no reorder buffer, as is present in multiple-issue microprocessors, for reordering instructions in an instruction stream and for issuing the instructions to multiple execution pipelines.

The T-stage 111 further comprises a microcode ROM (read-only-memory) 116. Some macroinstructions, typically complex or infrequently executed macroinstructions, are performed by microinstruction sequences comprised in the microcode ROM 116 rather than by microinstructions translated by the translator 114. Additionally, microcode ROM 116 comprises microinstruction sequences for handling exceptions, such as page faults, interrupts, arithmetic errors and so forth. In one embodiment of the present invention, the microcode ROM 116 executes microinstruction sequences to flush the pipeline 100 and to re-execute instructions in the microprocessor pipeline 100 following a stalled instruction upon completion of the stalled instruction, as will be described below.

The R-stage 121 comprises a register file 124 that stores the program visible state of the microprocessor 100. Preferably, the register file 124 comprises a register set compatible with the x86 architecture. The register file 124 comprises operand registers used to calculate addresses, such as memory addresses used to access data in memory 194. Instructions and the operands specified thereby are placed in a register 132 for use by the A-stage 131.

The A-stage 131 comprises an address generator 134 that receives operands from register 132 and generates addresses from the operands for storage in a register 142. Preferably, the addresses generated by address generator 134 are linear, or virtual, addresses for addressing data or instructions in memory 194 as defined by the x86 architecture.

The microprocessor 100 further comprises a data cache 190 that caches data from memory 194. The data cache 190 is coupled to a bus interface unit 192. The bus interface unit 192 couples microprocessor 100 to system memory 194 via processor bus 148. Preferably, bus 148 allows multiple simultaneously outstanding requests for data from system memory 194. Preferably, bus 148 also allows outstanding requests to complete on bus 148 out of order with respect to the order the requests were issued. In one embodiment, bus 148 comprises a Socket 370 bus, which allows for up to 8 outstanding bus requests. In another embodiment, bus 148 comprises a Socket 7 bus, which allows for up to 2 outstanding bus requests.

The data cache 190 receives operands and instructions from register 132 via signals 136. The data cache 190 also receives addresses from address generator 134 via signals 138. The data cache 190 provides data to a data register 166 via signals 154. The data cache 190 uses the operands, instructions and addresses received via signals 136 and 138 to determine whether requested data, such as data requested by a load instruction, is in the data cache 190. If the requested data is in the data cache 190, the data cache 190 provides the data to data register 166.

In one embodiment, data cache 190 accesses require two processor clock cycles. Consequently, microprocessor 100 comprises both the D-stage 141 and the G-stage 151 for data accesses. Register 152 and register 162 store microinstructions and associated addresses and operands as the instructions proceed down the pipeline 100 through the D-stage 141 and G-stage 151, respectively. If the requested data is not in the data cache 190, i.e., if a data cache miss occurs, the data cache 190 accesses system memory 194 to obtain the requested data. The data cache 190 will be described in more detail with respect to FIG. 2 below.

The pipeline 100 further comprises an E-stage 161 comprising one or more execution units 164. Preferably, execution unit 164 comprises an integer unit, a floating point unit and an MMX unit. If an instruction, such as a load instruction, generates a data cache 190 miss in the G-stage 151, then the instruction stalls in the E-stage 161 waiting for the data to become available. Furthermore, if an instruction is a multi-processor clock cycle instruction, such as a floating point or MMX arithmetic instruction, e.g., a multiply, the instruction may stall in the E-stage 161. The execution unit 164 places the execution results in a register 172. Instructions are also passed down through the E-stage 161 into register 172.

Preferably, each of registers 112, 122, 132, 142, 152, 162, 172 and 182 comprises multiple registers for storing constituent elements, such as instructions, operands and addresses. Furthermore, the registers, referred to collectively as staging registers, except for registers 172 and 182, comprise multiplexed-registers. The multiplexers preceding the registers receive both the output of the previous stage as well as the present contents of the register fed back into the multiplexer for storage on the next clock edge. The multiplexer is controlled by a stall signal indicating a stall condition in the pipeline. This arrangement enables each stage to maintain its contents in the event of a stall condition in the pipeline 100. That is, the staging registers retain the present contents of the stage until the stall condition terminates.

If a stall condition occurs in the pipeline 100 such as a load, floating point or MMX instruction stalling in the E-stage 161, each of the stages above the stage in which the stalled instruction resides are also stalled. That is, instructions in stages above the stalled stage are not allowed to proceed down the pipeline 100 and thereby execute out of order with respect to instructions in lower stages of the pipeline 100. Thus, microprocessor 100 is an in-order microprocessor.

The pipeline 100 further comprises an S-stage 171 comprising store logic 174 for storing results from register 172 into memory 194. Finally, the pipeline 100 comprises a W-stage 181 comprising write-back logic 184 for writing results from register 182 back into register file 124, thereby updating the program-visible state of the microprocessor 100.

Figure 2:
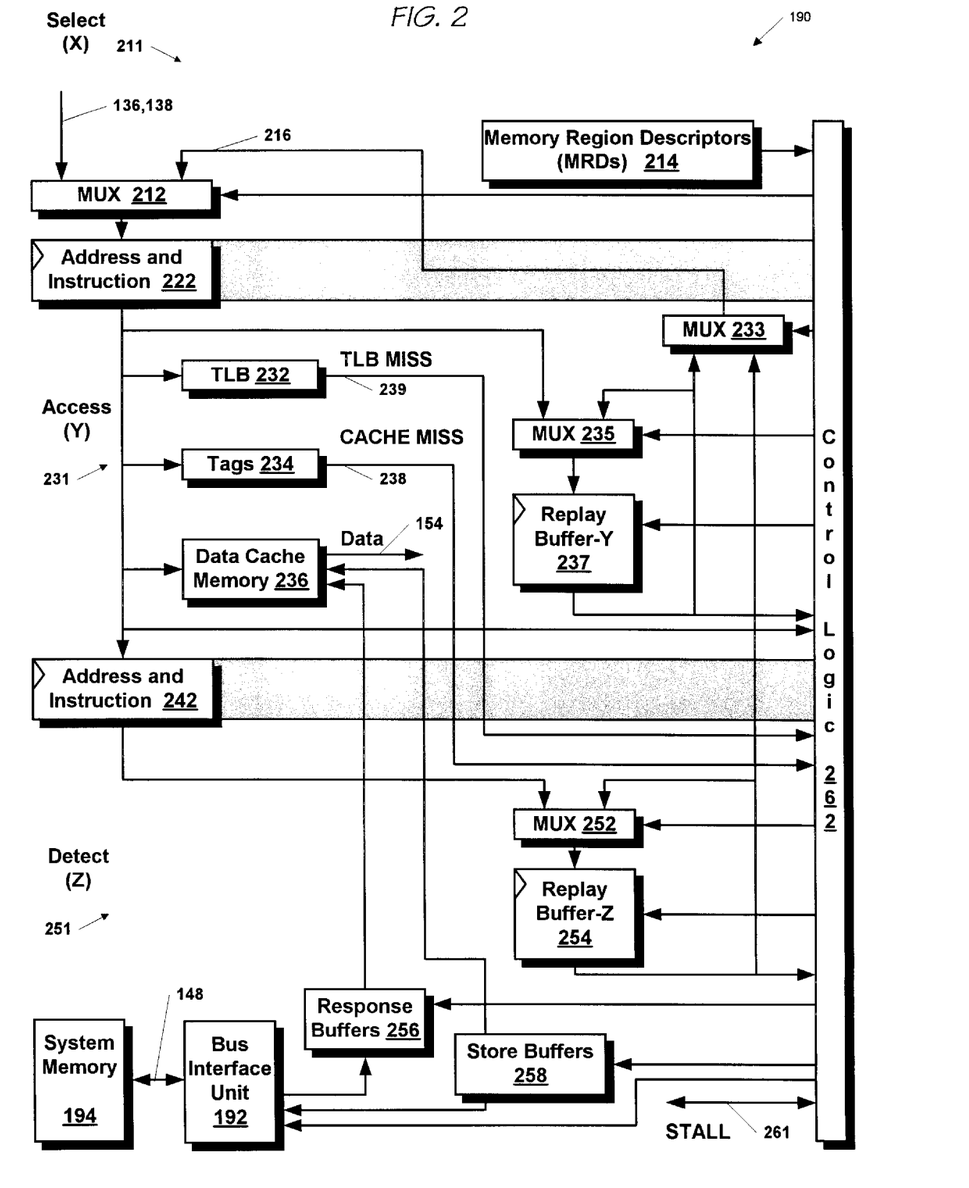
FIG. 2 is a block diagram of the data cache and related elements of the microprocessor of FIG. 1 according to the present invention.

Referring now to FIG. 2, a block diagram of the data cache 190 and related elements of the microprocessor 100 of FIG. 1 according to the present invention is shown. The data cache 190 comprises three pipeline stages including: Select (X) stage 211, Access (Y) stage 231 and Detect (Z) stage 251. The X-stage 211, Y-stage 231 and Z-stage 251 parallel the main pipeline 100 A-stage 131, D-stage 141 and G-stage 151, respectively.

The data cache 190 comprises a data cache memory 236 for storing cached data from system memory 194. Cache memory 236 provides data on signals 154 of FIG. 1 to data register 166 of FIG. 1. The cache memory 236 is addressed by linear addresses from an address register 222.

The data cache 190 also comprises a data tag memory 234 that receives the address from register 222. The tags 234 generate a cache miss signal 238 for indicating whether the data specified by the address from register 222 is present in the cache memory 236.

The data cache 190 also comprises a translation lookaside buffer (TLB) 232 that receives the address from register 222. The TLB 232 caches physical addresses translated from virtual addresses in microprocessors that provide a memory paging system, as does microprocessor 100. TLB 232 generates a TLB miss signal 239 for indicating whether the physical memory address specified by the virtual address of register 222 is present in the TLB 232. Cache memories, tags and translation lookaside buffers are well known in the art of microprocessor design.

In addition to data addresses, register 222 stores associated instructions. Register 222 parallels register 142 of the main pipeline of microprocessor 100 of FIG. 1. However, register 222 is not a multiplexed register as is register 142. Therefore, even during a stall condition, instructions and data addresses continue to flow down the data cache 190 pipeline stages X 211, Y 231 and Z 251 on each processor clock cycle. That is, instructions and addresses flow from register 222 to register 242 on each successive clock cycle even during a stall condition. Thus, even though the pipeline is stalled, the control logic 262 will detect whether the two instructions in the data cache 190 following the stalled instruction in the E-stage 161 generate a cache miss or TLB miss. Register 242 parallels register 152 of the main pipeline 100. Like register 222, register 242 is also not a multiplexed register.

During a first clock cycle, an address is supplied to cache memory 236, tags 234 and TLB 232. That is, the cache memory 236, tags 234 and TLB 232 are accessed in the Y-stage 231. However, because the accesses require two processor clock cycles, the data is not valid on signals 154 until the following clock cycle. Additionally, the TLB miss signal 239 and the cache miss signal 238 are not valid until the following clock cycle. That is, in the Z-stage 251, control logic 262, coupled to TLB miss signal 239 and cache miss signal 238, detect whether a cache miss or TLB miss has occurred.

Control logic 262 generates a stall signal 261 in response to detection of a TLB miss or cache miss indicated on TLB miss signal 239 or cache miss signal 238, respectively. Preferably, stall signal 261 is a bi-directional signal. That is, control logic 262 also receives stall signal 261 from the execution unit 164 of FIG. 1 to indicate a stall condition, such as execution of a lengthy floating point or MMX instruction.

The data cache 190 further comprises a replay buffer-Y 237 for storing state information associated with the instruction in the Y-stage 231 upon detection of a stall condition. Replay buffer-Y 237 receives the output of a mux 235. Mux 235 has two inputs. The first input is the output of replay buffer-Y 237. The second input is the output of register 222. Control logic 262 controls mux 235 to select the contents of register 222, i.e., the Y-stage 231 instruction and associated address, only on the first cycle in which stall 261 is asserted. Otherwise, control logic 262 controls mux 235 to select the contents of replay buffer-Y 237 in order to retain the contents of replay buffer-Y 237 in itself.

The data cache 190 further comprises a replay buffer-Z 254 for storing state information associated with the instruction in the Z-stage 251 upon detection of a stall condition. Replay buffer-Z 251 receives the output of a mux 252. Mux 252 has two inputs. The first input is the output of replay buffer-Z 254. The second input is the output of register 242. Control logic 262 controls mux 252 to select the contents of register 242, i.e., the Z-stage 251 instruction and associated address only on the first cycle in which stall 261 is asserted. Otherwise, control logic 262 controls mux 252 to select the contents of replay buffer-Z 254 in order to retain the contents of replay buffer-Z 254 in itself.

The outputs of replay buffer-Y 237 and replay buffer-Z 254 are coupled to the inputs of a mux 233. The output of mux 233 is coupled to one input of a mux 212. Mux 233 is controlled by control logic 262 to select the output of either replay buffer-Y 237 or replay buffer-Z 254 one or two clock cycles, respectively, prior to deassertion of stall 261 in order to restore the state of registers 222 and 242, as will be described in more detail below with respect to FIG. 3.

Mux 212 receives as its other input instructions and associated operands and addresses from the A-stage 131 of FIG. 1 via signals 136 and 138. Mux 212 is controlled by control logic 262 to select the output of mux 233 prior to deassertion of stall 261 in order to restore the state of registers 222 and 242, as will be described in more detail below with respect to FIG. 3.

The microprocessor 100 further comprises response buffers 256 and store buffers 258 coupled between the data cache 236 and the bus interface unit 192 of FIG. 1. The response buffers 256 receive data requested from system memory 194 on processor bus 148 and provide the data to cache memory 236. The store buffers 258 receive data from execution unit 164 and store logic 174 and provide the data to system memory 194 on bus 148 and cache memory 236. In one embodiment, the number of response buffers 256 is 8 and the number of store buffers 258 is 8. Control logic 262 controls the allocation and use of the response buffers 256 in order to load missing data or page table information from system memory 194 into the data cache memory 236 or TLB 232. Control logic 262 controls the allocation and use of the store buffers 258 to write data to system memory 194. If the control logic 262 is unable to allocate a response buffer 256 or store buffer 258 when needed, the control logic 262 must assert stall 261 to stall the pipeline 100.

The data cache 190 further comprises memory region descriptors (MRDs) 214, coupled to control logic 262. The MRDs 214 are user-programmable registers which describe ranges of the address space of the microprocessor 100. In particular, the MRDs 214 are programmed to describe regions of the microprocessor 100 address space in which memory-mapped I/O devices reside, such as DMA controllers, disk drives and modems. The control logic 262 determines whether the address received from register 222 is in any of the memory-mapped I/O ranges specified in the MRDs 214. If so, then control logic 262 does not issue requests on bus 148 during a stall condition.

Figure 3:
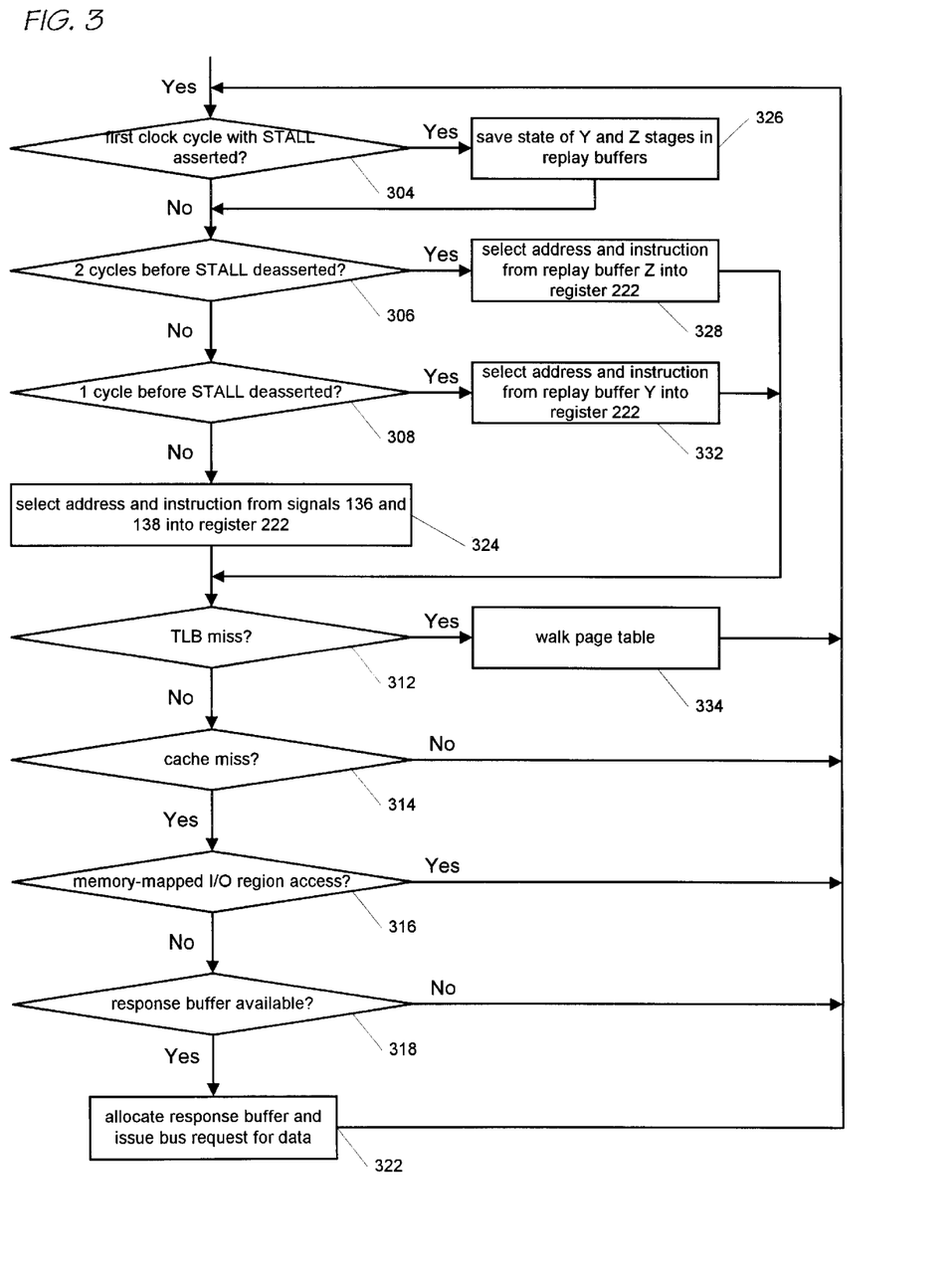
FIG. 3 is a flow chart illustrating operation of the data cache of FIG. 2 according to the present invention.

Referring now to FIG. 3, a flow chart illustrating operation of the data cache 190, and particularly of control logic 262, of FIG. 2 according to the present invention is shown. If stall 261 is asserted, control logic 262 determines whether this is the first clock cycle that stall 261 is asserted after not having been asserted, in step 304. If so, control logic 262 controls mux 235 to select the output of register 222 and controls mux 252 to select the output of register 242, in step 326. This saves the state of the Y-stage 231 (which is also the state of the D-stage 141) and the Z-stage 251 (which is also the state of the G-stage 151) so that the state of the data cache 190 may be restored when the pipeline 100 resumes, i.e., when the stall condition terminates.

Control logic 262 determines whether stall 261 will be deasserted in two clock cycles, in step 306. Preferably, bus interface unit 192 notifies control logic 262 regarding reception of data from bus 148. Therefore, control logic 262 is enabled to anticipate the deassertion of stall 261 caused by a load miss, i.e., by a miss of cache memory 236, generated by a load instruction stalled in the E-stage 161. If the present cycle is two clock cycles prior to deassertion of stall 261, then control logic 262 controls mux 233 to select the output of replay buffer-Z 254 and controls mux 212 to select the output of mux 233, in step 328. This places in register 222 the state of register 242 at the first cycle in which stall 261 was previously asserted.

If control logic 262 determines stall 261 will not be deasserted in two clock cycles, control logic 262 determines whether stall 261 will be deasserted in one clock cycle, in step 308. If so, control logic 262 controls mux 233 to select the output of replay buffer-Y 237 and controls mux 212 to select the output of mux 233, in step 332. The execution of steps 328 and 332 on successive clock cycles operates to restore the contents of register 222 with the state of register 222 and the contents of register 242 with the state of register 242 at the first cycle in which stall 261 was previously asserted.

If control logic 262 determines in steps 306 and 308 that stall 261 will not be deasserted in one or two clock cycles, or determines that stall 261 is not asserted, control logic 262 controls mux 212 to select the A-stage 131 instruction and address via signals 136 and 138, in step 324.

In addition to making the determinations of steps 304 through 308 and selectively performing the corresponding actions, control logic 262 determines, via TLB miss signal 239, whether a TLB miss was generated, in step 312. If so, data cache 190 performs a page table walk, in step 334. Preferably, microprocessor 100 is an x86 architecture microprocessor and supports x86-style page translation, as described in section 11.3 of the Intel Pentium Processor Family Developer's Manual Volume 3: Architecture and Programming Manual, 1995, which is hereby incorporated by reference. In one embodiment, microprocessor 100 includes a page directory cache (not shown) for caching page directory table data. Furthermore, page table information may be present in the cache memory 236. Thus, step 334 may include determining whether the needed page directory entry or other page table information is present in the page directory cache or data cache 190 in order to avoid performing accesses of system memory 194.

Advantageously, if the TLB miss was generated during a stall condition by an instruction above the stalled instruction in the pipeline 100, then the present invention performs the page table walk in parallel with resolution of the stalled instruction, thereby reducing the page table walk latency that would otherwise be incurred.

Additionally, the control logic 262 determines, via cache miss signal 238, whether a cache miss was generated, in step 314. If a cache miss is generated, control logic 262 determines whether the access that generated the cache miss is to a memory-mapped I/O region, as specified in the MRDs 214, in step 316. If the access is not to a memory-mapped I/O region, control logic 262 determines whether a response buffer 256 is available, in step 318. If a response buffer 256 is available, control logic 262 allocates a response buffer 256 and issues a request on bus 148 to system memory 194 for the missing data, in step 322. Preferably, control logic 262 issues a request on bus 148 to system memory 194 for a cache line in which the missing data resides.

Advantageously, if the cache miss was generated during a stall condition by an instruction above the stalled instruction in the pipeline 100, then the present invention performs the load of the missing data in parallel with resolution of the stalled instruction, thereby reducing the memory access latency that would otherwise be incurred. This advantage is more fully illustrated by the example below with respect to FIG. 5.

If control logic 262 determines in step 314 that no cache miss is generated, or in step 316 that the access is to a memory-mapped I/O region, or in step 318 that no response buffers 256 are available, then control returns to step 304 to wait for the next clock cycle.

Preferably, microprocessor 100 is an x86 architecture processor. Consequently, microprocessor 100 includes an input/output (I/O) address space that is separate from the memory address space. The I/O address space is used to access I/O devices, such as DMA controllers, disk drives, modems, etc. Inherently, load and store instructions that access I/O space, such as the x86 "in" and "out" instructions, are not cached. Consequently, I/O instructions do not generate misses in the data cache 236. Additionally, I/O instructions do not require page translation. Therefore, I/O instructions also do not generate misses of the cache memory 236. Thus, in step 314, an I/O instruction would not generate a cache miss in the data cache 236. Similarly, in step 312, an I/O instruction would not generate a miss in the TLB 232.

Figure 4:
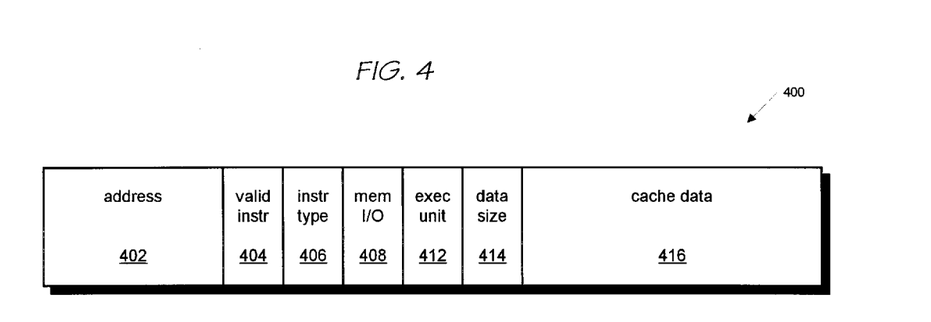
FIG. 4 is a block diagram of the data cache state information stored in the replay buffers of FIG. 2 according to one embodiment of the present invention.

Referring now to FIG. 4, a block diagram of data cache state information 400 stored in the replay buffers 237 and 254 of FIG. 2 according to one embodiment of the present invention is shown. As described with respect to FIG. 2, in one embodiment the state information stored in the replay buffers 237 and 254 comprises similar information as flows down the main pipeline of the microprocessor 100, namely instructions and addresses. The embodiment of FIG. 4 advantageously stores a subset of the entire instruction and address information, thereby reducing the amount of hardware required to save the state information.

The state information 400 of the embodiment of FIG. 4 comprises a data address 402 as in the other embodiment. Preferably, the address comprises an x86 linear address. The state information 400 further comprises a valid instruction bit 404 indicating whether the instruction associated with the address 402 is a valid instruction to be executed by the microprocessor 100. The valid instruction bit 404 is necessary since bubbles may be inserted in the pipeline 100 during pipeline stalls, thereby producing stages with invalid instructions in the instruction registers.

The state information 400 further comprises an instruction type field 406 for indicating whether the instruction is a load, store, prefetch, read-verify-write, load-store or special cycle (such as a halt or flush) type instruction. The state information 400 further comprises a memory-I/O bit 408 for indicating whether the instruction addresses memory space or I/O space of the microprocessor 100. The state information 400 further comprises an execution unit field 412 for indicating which execution unit, i.e., integer, floating point or MMX, will provide data if the instruction is a store type instruction. The state information 400 further comprises a data size field 414 for indicating the number of bytes of data accessed by the instruction. In one embodiment, the size indicates 1, 2, 3, 4 or 8 bytes. The information stored in fields 406, 408, 412 and 414 is generated by the data cache 190 by decoding the instruction prior to placing the state information 400 in the replay buffers 237 and 254.

The state information 400 for replay buffer-Z 254 further comprises a cache data field 416 for storing cache data when an instruction to be replayed from replay buffer-Z 254 has generated a cache hit in the cache memory 236.

Figure 5:
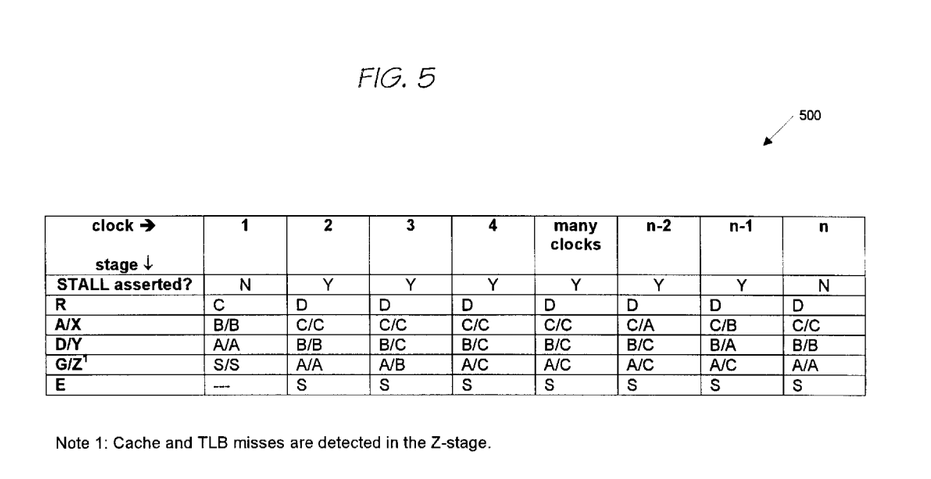
FIG. 5 is a table illustrating operation of the microprocessor of FIG. 1 according to the flowchart of FIG. 4 according to the present invention.

Referring now to FIG. 5, a table 500 illustrating operation of the microprocessor 100 of FIG. 1 according to the flowchart of FIG. 4 according to the present invention is shown. The top row of table 500 indicates a clock cycle number. Clock cycles 1 through 4, n−2, n−1, n and a column representing an undetermined number of clock cycles between 4 and n−2 are shown, where n−2 is the number of clock cycles the stall signal 261 of FIG. 2 is asserted during a stall condition. The second row of table 500 indicates whether stall 261 is asserted. Potentially, stall 261 may be asserted for many clock cycles. For example, a typical stall caused by a cache miss of TLB miss may take on the order of 40 clock cycles. In table 500, stall 261 is asserted in clock cycle 2 and is deasserted in clock cycle n.

The left column of table 500 indicates the various stages of the microprocessor 100 pipeline. In particular, the R-stage 121 contents are shown in the third row. The A-stage 131 and X-stage 211 contents are shown in the fourth row. The D-stage 141 and Y-stage 231 contents are shown in the fifth row. The G-stage 151 and Z-stage 251 contents are shown in the sixth row. The E-stage 161 contents are shown in the seventh row. The remaining entries in table 500 indicate the location in the pipeline stages of the microprocessor 100 of instructions, named A, B, C, D and S. Instruction S is the instruction generating the stall condition. Instructions A, B, C and D are other instructions that may or may not generate misses of the data cache 190 or TLB 232. Instructions are issued by the translator 114 or microcode ROM 116 and proceed down the pipeline 100 in the following order in the in-order microprocessor 100: S, A, B, C, D.

During clock 1, instruction S is in the Z-stage 251 and in the G-stage 151. Stall 261 is not asserted. If control logic 262 of FIG. 2 determines in step 312 of FIG. 3 that instruction S generates a miss of TLB 232, then in step 334 control logic 262 performs a page table walk during subsequent clocks to translate the data virtual address to the physical address of system memory 194. Similarly, if the control logic 262 determines in step 314 that instruction S generated a miss of data cache 190, determines in step 316 that the access is not to a memory-mapped I/O region and determines in step 318 that a response buffer is available, then in step 322 control logic 262 allocates a response buffer 256 and issues a request on bus 148 for the missing data.

During clock cycle 1, instruction A occupies the Y-stage 231 and the D-stage 141. Because instruction A occupies the Y-stage 231, the data address of instruction A is supplied to cache memory 236, tags 234 and TLB 232 during clock 1 for determination of the presence of a cache miss or TLB miss in clock 2. Instruction B occupies the X-stage 211 and the A-stage 131. Because instruction B occupies the A-stage 131, address generator 134 generates the data address of instruction B during clock 1. Instruction C occupies the R-stage 121.

During clock 2, instruction S proceeds to the E-stage 161 and stalls, i.e., stall 261 is asserted, either by control logic 262 or by execution unit 164. If the stall condition is caused by a cache 236 miss or TLB 232 miss or unavailability of a store buffer 258 or response buffer 256 or some other data cache 190 condition, then control logic 262 asserts stall 261. For the remaining clocks until stall 261 is deasserted, instruction S remains in the E-stage 161 waiting for resolution of the stalled condition. That is, if instruction S is an MMX or floating point instruction, instruction S stalls in the E-stage 161 waiting for execution to complete. If instruction S is a cache miss, instruction S stalls in the E-stage 161 waiting for its data from system memory 194.

During clock 2, each of the other instructions proceeds downward to occupy the next stage in the pipeline and instruction D proceeds from the T-stage 111 to the R-stage 121. For the remaining clocks until stall 261 is deasserted, instructions S, A, B, C and D remain in stages E 161, G 151, D 141, A 131 and R 121, respectively, due to the assertion of stall 261.

During clock 2, the data address of instruction B is supplied to the cache memory 236, tags 234 and TLB 232 so that on the next clock the control logic 262 can detect whether instruction B generates a cache or TLB miss. Additionally, the data address for instruction C is generated by the address generator 134. Instruction C proceeds to stage-X 211 according to step 324.

During clock 2, control logic 262 determines, in step 304, that clock 2 is the first cycle that stall 261 is asserted, and saves the state of instruction B in replay buffer-Y 237 and instruction A in replay buffer-Z 254 in step 326 of FIG. 3.

During clock 2, if instruction A generates a cache miss in the Z-stage 251, control logic 262 detects the cache miss, allocates a response buffer 256 and requests the missing data if the access is not to a memory-mapped I/O region, as described in steps 314 through 322 of FIG. 3. Thus, during a stall condition, the present invention advantageously detects a cache miss generated by an instruction behind the stalled instruction in the in-order single-issue pipeline 100 and issues a request on the bus 148 for the missing data. Consequently, a memory access latency reduction for the instruction following the stalled instruction is achieved because the access of memory 194 is overlapped with the resolution of the stalled instruction in the E-stage 161. The memory access latency for the non-stalled load miss is reduced by approximately the number of clock cycles required to resolve the stalled E-stage 161 instruction. That is, the present invention advantageously detects cache misses and fetches missing data concurrently with stalled instruction resolution, thereby reducing memory access latency relative to in-order processors that simply stall the entire pipeline above the stage in which the stall occurs. Similarly, the present invention reduces page table walk latencies by detecting TLB misses and performing page table walks concurrently with resolution of the stalled instruction, as described in FIG. 3.

During clock 3, instruction C continues to be selected into stage-X 211 according to step 324. Instruction C also proceeds to stage-Y 231 and its address is advantageously provided to cache memory 236, TLB 232 and tags 234. Instruction B proceeds to the Z-stage 251 where control logic 262 advantageously determines whether instruction B has generated a cache or TLB miss. Control logic 262 advantageously selectively fetches missing data or performs a page table walk for instruction B, according to steps 312 through 322 and 334, overlapped with resolution of the stalled condition generated by instruction S.

During clock 4, instruction C proceeds to the Z-stage 251 where control logic 262 advantageously determines whether instruction C has generated a cache or TLB miss. Control logic 262 advantageously selectively fetches missing data or performs a page table walk for instruction C, according to steps 312 through 322 and 334, simultaneously with resolution of the stalled condition generated by instruction S. The instructions remain in the same stages as in clock 4 for about 40 processor clocks typically, waiting for the stall condition to be resolved. Thus, up to four load misses may be detected by the data cache 190 and during the stall condition the missing data may be fetched in an overlapped fashion to reduce the memory access latency of the missing data fetches according to the embodiment of the present invention shown in FIG. 2. A similar advantageous result may be obtained by the present invention for TLB misses or a combination of cache misses and TLB misses.

During clock n−2, stall 261 is still asserted and control logic 262 detects that stall 261 will be deasserted in 2 clock cycles. In particular, control logic 262 determines that the data specified by instruction S that was detected during clock 1 as missing from cache memory 236 has been returned from system memory 194 via bus 148 into response buffer 256. Control logic 262 detects this condition in step 306 and controls multiplexers 233 and 212 to select the state information for instruction A from replay buffer-Z 254 into stage-X 211.

During clock n−1, stall 261 is still asserted and control logic 262 detects that stall 261 will be deasserted in 1 clock cycle. Control logic 262 detects the condition in step 308 and controls multiplexers 233 and 212 to select the state information for instruction B from replay buffer-Y 237 into stage-X 211. Instruction A proceeds to stage-Y where its address is supplied to cache memory 236, TLB 232 and tags 234. Control logic 262 writes the returned data for instruction S from the response buffer 256 into the cache memory 236.

During clock n, stall 261 is deasserted. Control logic 262 controls mux 212 to select instruction C into register 222, according to step 324. As may be observed from FIG. 5, the state of the pipeline 100 stages when stall 261 is deasserted in clock n is the same as the state when stall 261 was asserted in clock 2.

Due to the overlapping of memory accesses associated with cache or TLB misses generated by instructions A, B, and C with the resolution of the stall caused by instruction S, the next time instructions A, B and C proceed through the data cache 190, the probability that their data will be in the cache memory 236 is high. The probability is dictated primarily by the characteristics of bus 148, the amount of traffic on bus 148 and the characteristics of system memory 194.

The advantages of the present invention may be appreciated by considering a "best case" situation. Assume that instructions S, A, B and C are four load instructions flowing successively down the pipeline 100, each generating a load miss, i.e., a miss of the cache memory 190. Furthermore, let us assume that none of the load instructions access a memory-mapped I/O region and that four response buffers 256 are available. By overlapping fetches from system memory 194 of the missing data as described above, the present invention essentially reduces the aggregate memory access time for the four instructions to almost one fourth of the time required to execute the four instructions without the advantage of the present invention. This is because the large, typically 40 processor clock cycle, memory access latency of instructions A, B and C is overlapped with resolution of instruction S, i.e., with the memory access time for data of instruction S. Furthermore, even if only one of instructions A, B and C is a load miss, the aggregate memory access time for the instructions is approximately one half the time required to execute the instructions without the advantage of the present invention.

Although the present invention and its objects, features, and advantages have been described in detail, other embodiments are encompassed by the invention. For example, the notion of saving instruction state information in replay buffers is not limited to the specific stages described. Rather, the notion could be extended as far up the pipeline as address generation hardware would allow in order to detect cache and TLB misses while a stall condition exists.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A data cache in an in-order single instruction issue microprocessor, the data cache comprising:
    a cache memory, for storing data;
    an address register, coupled to said cache memory, for supplying an address to said cache memory;
    at least one buffer, for storing state information regarding a plurality of instructions in the data cache upon detection of a stall condition in the in-order single-issue microprocessor; and
    control logic, coupled to said buffer and said cache memory, configured to detect said stall condition, to save in response thereto said state information in said buffer, and to determine during said stall condition whether data specified by one or more of said plurality of instructions is missing in said cache memory, wherein said control logic is further configured to restore an address in said address register based on said state information stored in said buffer, wherein said control logic restores said address prior to termination of said stall condition.

2. The data cache of claim 1, wherein said control logic is further configured to request said missing data from a memory coupled to the microprocessor during said stall condition.

3. The data cache of claim 2, wherein said control logic is further configured to allocate one or more response buffers in the microprocessor for receiving said missing data prior to requesting said missing data.

4. The data cache of claim 2, wherein said control logic is further configured to request said missing data only if said missing data is located in a non-memory-mapped I/O region of an address space of the microprocessor.

5. The data cache of claim 2, wherein said control logic is further configured to request said missing data only if said one or more of said plurality of instructions does not access an input/output address space of the microprocessor.

6. The data cache of claim 1, wherein said control logic is further configured to request a cache line including said missing data during said stall condition.

7. The data cache of claim 1, wherein said stall condition is caused by an instruction in a stage of the in-order single instruction issue microprocessor in or below the data cache.

8. The data cache of claim 1, wherein said stall condition is caused by an instruction specifying data missing in said cache memory.

9. The data cache of claim 8, wherein said instruction specifying said missing data precedes said plurality of instructions.

10. The data cache of claim 1, wherein said stall condition is caused by execution of a floating-point instruction within the in-order single-issue microprocessor.

11. The data cache of claim 1, wherein said stall condition is caused by execution of an MMX instruction within the in-order single-issue microprocessor.

12. The data cache of claim 1, further comprising:

a translation lookaside buffer, configured to cache physical memory addresses translated from linear memory addresses.

13. The data cache of claim 12, wherein said stall condition is caused by said control logic detecting a physical memory address associated with an instruction preceding said plurality of instructions missing from said translation lookaside buffer.

14. The data cache of claim 1, wherein said stall condition is caused by unavailability of a store buffer in the in-order single-issue microprocessor required by a store instruction preceding said plurality of instructions.

15. The data cache of claim 1, wherein said state information comprises an address specified by one or more of said plurality of instructions for addressing said cache memory.

16. The data cache of claim 15, wherein said address is a linear memory address.

17. The data cache of claim 1, wherein said state information specifies a number of bytes of data specified by one or more of said plurality of instructions.

18. The data cache of claim 1, wherein said state information specifies an instruction type of one or more of said plurality of instructions.

19. A data cache in an in-order single instruction issue microprocessor, the data cache comprising:

a translation lookaside buffer (TLB), for storing physical memory addresses;

at least one buffer, for storing state information regarding a plurality of instructions in the data cache upon detection of a stall condition in the in-order single-issue microprocessor; and control logic, coupled to said buffer and said TLB, configured to detect said stall condition, to save in response thereto said state information in said buffer, and to determine during said stall condition whether a physical address associated with one or more of said plurality of instructions is missing in said TLB.

20. The data cache of claim 19, wherein said control logic is further configured to perform a page table walk during said stall condition in order to translate said physical address from a virtual address specified by said one or more of said plurality of instructions.

* * * * *